(12) United States Patent
Boriack et al.

(10) Patent No.: US 10,285,322 B2
(45) Date of Patent: May 14, 2019

(54) STACKING PLANTER TOOLBAR WITHOUT FOUR-BAR LINKAGE

(71) Applicant: CNH Industrial America LLC, New Holland, PA (US)

(72) Inventors: Cale N. Boriack, Lititz, PA (US); Buweneke A. Fernando, Ann Arbor, MI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/654,238

(22) Filed: Jul. 19, 2017

(65) Prior Publication Data

US 2019/0021212 A1    Jan. 24, 2019

(51) Int. Cl.
| | | |
|---|---|---|
| *A01B 73/04* | (2006.01) | |
| *A01B 63/22* | (2006.01) | |
| *A01B 63/32* | (2006.01) | |
| *A01C 15/00* | (2006.01) | |
| *A01C 7/20* | (2006.01) | |
| *E06C 5/24* | (2006.01) | |

(52) U.S. Cl.
CPC ............ *A01B 73/044* (2013.01); *A01B 63/22* (2013.01); *A01B 63/32* (2013.01); *A01C 7/208* (2013.01); *A01C 15/006* (2013.01); *E06C 5/24* (2013.01)

(58) Field of Classification Search
CPC ..... A01B 73/04; A01B 73/044; A01B 73/046; A01B 73/048
See application file for complete search history.

(56) References Cited

U.S. PATENT DOCUMENTS

| | | | |
|---|---|---|---|
| 3,955,627 A | 5/1976 | Brown | |
| 4,030,551 A | 6/1977 | Boetto et al. | |
| 4,074,766 A | 2/1978 | Orthman | |
| 4,151,886 A | 5/1979 | Boetto et al. | |
| 4,171,726 A | 10/1979 | Ward | |
| 4,204,575 A * | 5/1980 | Richardson | A01B 73/046 172/1 |

(Continued)

OTHER PUBLICATIONS

925 Series Stacking Planter Toolbar 16Row 40, Orthman Dealer Zone, retrieved from: http://store.orthman.com/publicstore/Catalog/tabid/118/CategoryID/167/List/0/Level/a/ProductID/589/Default.aspx, May 9, 2017 (1 page).

*Primary Examiner* — Matthew D. Troutman
(74) *Attorney, Agent, or Firm* — Rebecca L. Henkel; Rickard K. DeMille (57) ABSTRACT

An agricultural implement including a stacking toolbar assembly. The stacking toolbar assembly includes a center toolbar, a center support beam, at least one pivot beam rotatably coupled to the center support beam at a first joint, at least one wing toolbar moveably coupled to the at least one pivot beam at a second joint, and an actuating system. The actuating system includes at least one first actuator coupled to the center support beam and the at least one pivot beam, and at least one second actuator coupled to the at least one pivot beam and the at least one wing toolbar. The at least one wing toolbar is moveable from a work position in which the at least one wing toolbar is substantially laterally aligned with the center toolbar and a transport position in which the at least one wing toolbar is stacked above the center toolbar.

20 Claims, 7 Drawing Sheets

(56) References Cited

U.S. PATENT DOCUMENTS

| | | | |
|---|---|---|---|
| 4,206,815 A * | 6/1980 | Hatcher | A01B 73/044 172/311 |
| 5,540,290 A | 7/1996 | Peterson et al. | |
| 5,577,563 A | 11/1996 | Holen | |
| 5,740,870 A | 4/1998 | Rodgers et al. | |
| 5,787,988 A | 8/1998 | Harlan et al. | |
| 5,921,325 A | 7/1999 | Meek et al. | |
| 6,003,615 A * | 12/1999 | Moore | A01B 73/044 172/311 |
| 6,367,562 B1 * | 4/2002 | Mosdal | A01B 73/046 172/311 |
| 7,073,604 B1 | 7/2006 | Dobson et al. | |
| 7,467,668 B2 | 12/2008 | Kimball | |
| 7,469,648 B2 | 12/2008 | Bettin | |
| 8,909,435 B2 | 12/2014 | Tuttle et al. | |
| 9,554,505 B2 | 1/2017 | Sivinski et al. | |
| 2006/0225900 A1 * | 10/2006 | Kimball | A01B 73/044 172/311 |
| 2009/0101373 A1 * | 4/2009 | Kimball | A01B 73/044 172/311 |
| 2015/0068779 A1 * | 3/2015 | Naylor | A01B 73/046 172/1 |
| 2015/0127230 A1 * | 5/2015 | Blunier | A01B 73/044 701/50 |

* cited by examiner

STACKING PLANTER TOOLBAR WITHOUT FOUR-BAR LINKAGE

BACKGROUND OF THE INVENTION

1. Field of the Invention

The present invention relates to agricultural implements, and, more particularly, to agricultural planters which include a folding toolbar.

2. Description of the Related Art

Agricultural planting implements (e.g., planters), which are towed by a tractor or other work vehicle, are commonly used to plant rows of seeds in soil. Typically, modern planting implements may include a chassis that carries one or more main seed hoppers that provide seed through an air stream to multiple auxiliary seed hoppers that are associated with one or more seed dispensing row units, which are distributed across the width of the implement. A pneumatic system carried by the chassis may supply positive or negative pressurized air to transport the seeds or other particulate from the storage tanks to the row units. The row units may respectively open a trench in the field, deposit seeds via a metering device, close the trench, and pack soil onto the seed in order to efficiently plant numerous rows of seeds.

As modern planting implements are becoming larger and larger, many planting implements include folding frames such that they can be folded in between a working position and a transport position. Folding planters may forwardly, rearwardly rotate, or vertically stack its frame members in order to minimize the lateral width of the planter, which would otherwise considerably extend beyond the width of the tractor. For example, some planters include a center frame and foldable end portions that vertically stack above the center frame. When planting in the field, the folding end portions of the frame are evenly aligned with the center frame. In the transport position, the folded end portions together occupy a width that is approximately the width of the center frame. Thereby, the planting implement may be suited for transport on a roadway.

Issues associated with folding planters may include increased cost and manufacturing complexity as well as a reduction of the space available on the folding support structure to mount various components. For example, to provide sufficient support and the necessary lifting force for some of the folding planters, an actuation system with accompanying linkages may be mounted onto the folding support structure. These complex actuation systems and linkages increase cost and occupy valuable space on the structural support.

What is needed in the art is a cost-effective and more streamlined folding agricultural implement.

SUMMARY OF THE INVENTION

The present invention provides a folding planter that has a stacking toolbar assembly which can be adjusted to be in a work position and a transport position.

The invention in one form is directed to an agricultural implement that includes a stacking toolbar assembly. The stacking toolbar assembly includes a center toolbar defining a first horizontal axis and a center support beam located above the center toolbar and defining a second horizontal axis substantially parallel to the first horizontal axis. The stacking toolbar assembly also includes at least one pivot beam rotatably coupled to the center support beam at a first joint, at least one wing toolbar moveably coupled to the at least one pivot beam at a second joint, and an actuating system. The actuating system includes at least one first actuator coupled to the center support beam and the at least one pivot beam. The actuating system also includes at least one second actuator coupled to the at least one pivot beam and the at least one wing toolbar such that the at least one wing toolbar is moveable from a work position in which the at least one wing toolbar is substantially laterally aligned with the first axis of the center toolbar and a transport position in which the at least one wing toolbar is stacked above the center toolbar.

The invention in another form is directed to a stacking toolbar assembly for an agricultural implement. The stacking toolbar assembly includes a center toolbar defining a first horizontal axis and a center support beam located above the center toolbar and defining a second horizontal axis substantially parallel to the first horizontal axis. The stacking toolbar assembly also includes a left pivot beam and a right pivot beam respectively rotatably coupled to the center support beam at a left first joint and a right first joint, a left wing toolbar and a right wing toolbar each being respectively moveably coupled to the left pivot beam and the right pivot beam at a respective left second joint and right second joint, and an actuating system. The actuating system includes a left first actuator and a right first actuator each being coupled to the center support beam and respectively coupled to the left pivot beam and the right pivot beam. The actuating system also includes a left second actuator and a right second actuator each being respectively coupled to the left pivot beam and the right pivot beam and the left wing toolbar and the right wing toolbar such that the left wing toolbar and the right wing toolbar are moveable from a work position in which the left and right wing toolbars are substantially laterally aligned with the first axis of the center toolbar and a transport position in which the left and right wing toolbars are stacked above the center toolbar.

An advantage of the present invention is that the stacking toolbar assembly reduces cost, reduces manufacturing complexity, and increases the space available on the toolbar to mount various components.

Another advantage of the present invention is that the actuating system can provide a downforce onto the toolbar wings.

Yet a further advantage of the present invention is that the stacking toolbar assembly may stack one or both of the toolbar wing sections without the need of gullwing cylinders and accompanying linkages.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
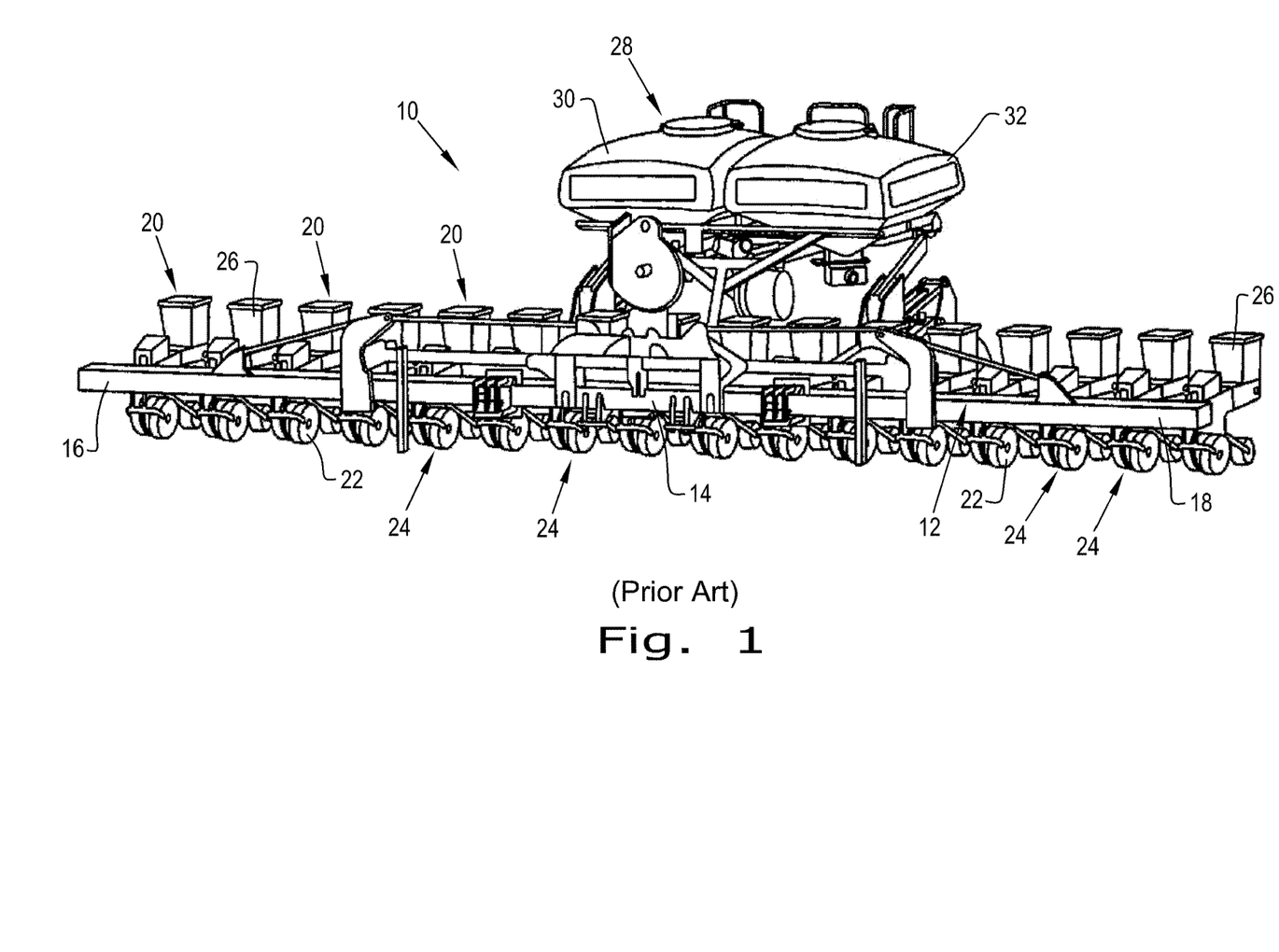
FIG. 1 is a perspective view of a planting implement known in the art.
Figure 2:
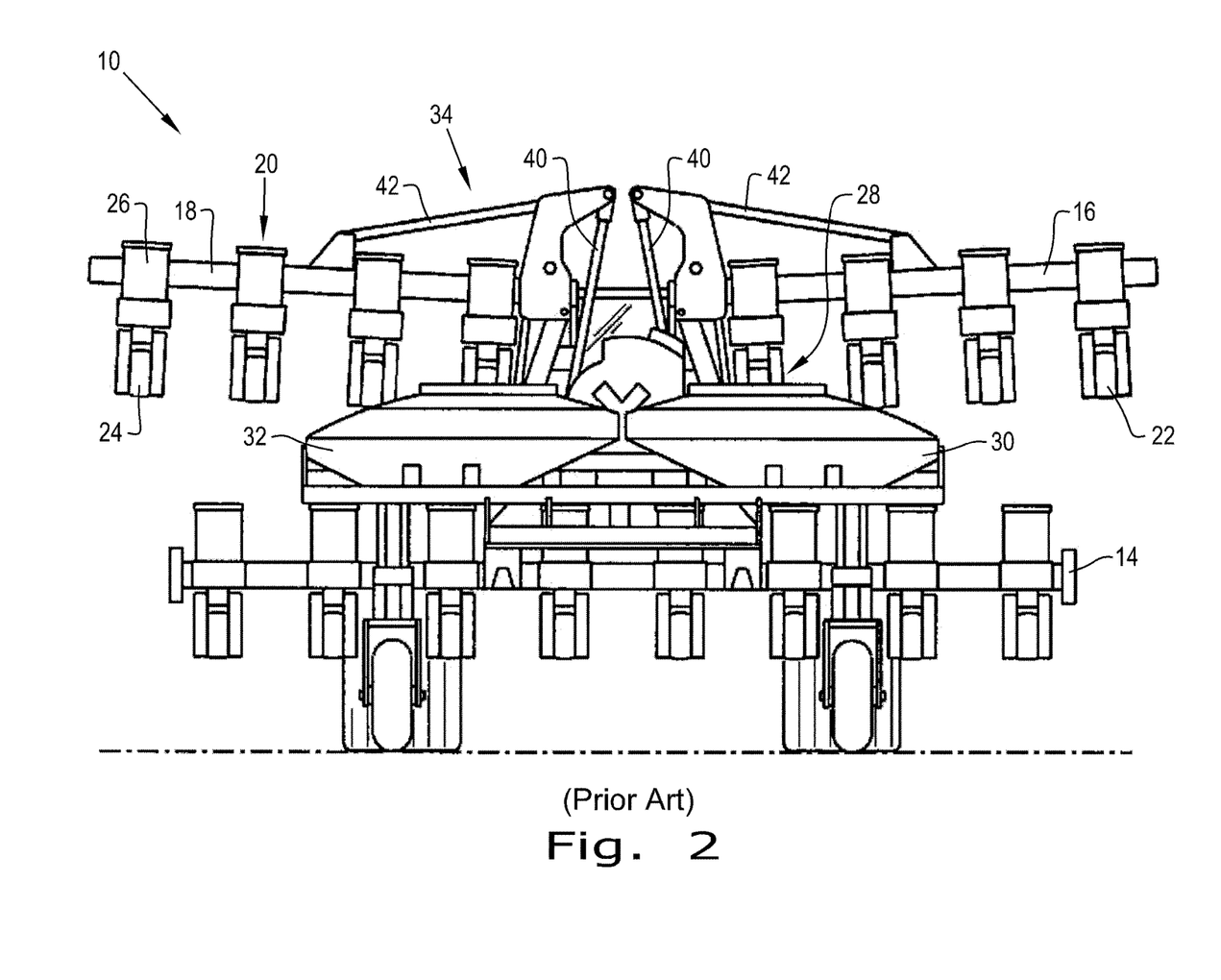
FIG. 2 is a rear view of the planting implement as shown in FIG. 1.
Figure 3:
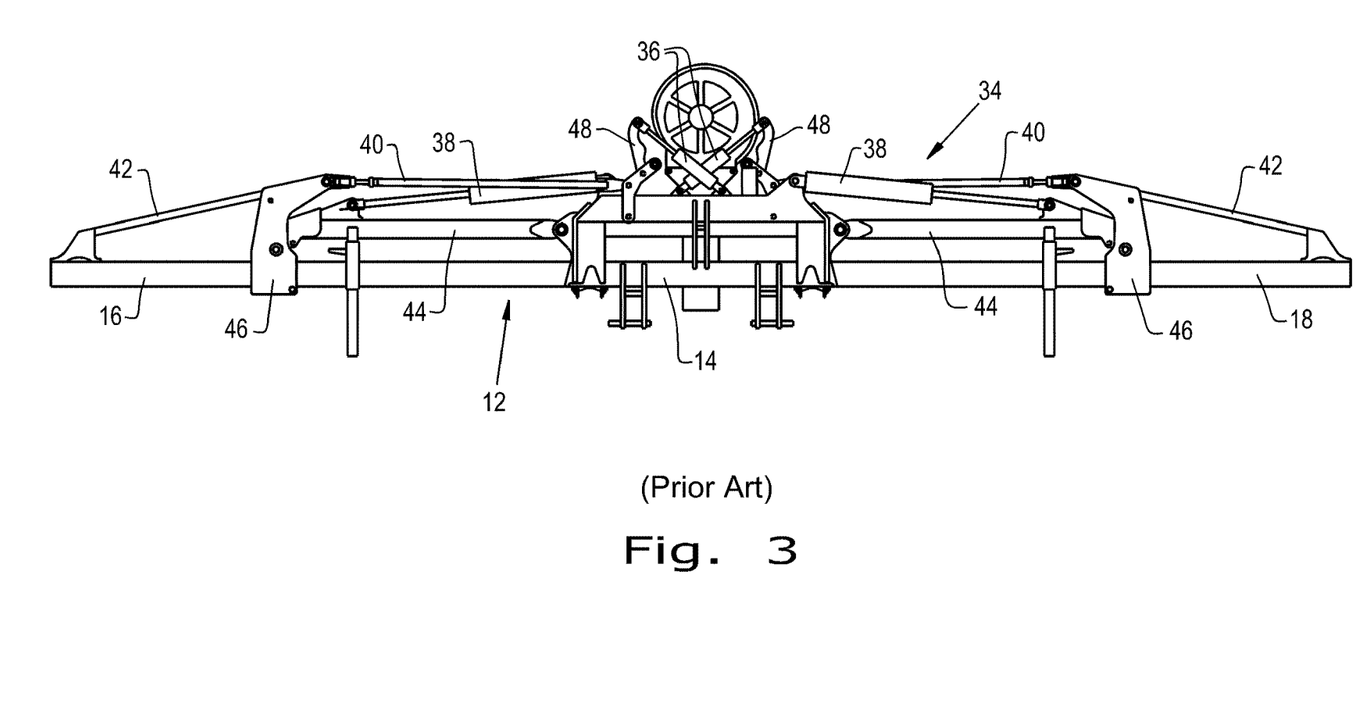
FIG. 3 is a front view of the toolbar of the planting implement as shown in FIGS. 1-2.

Referring now to the drawings, and more particularly to FIGS. 1-3, there is shown a prior art planting implement 10 that is in the form of a stack-fold implement 10. The planting implement 10 may be moveable in between a field-working position (FIG. 1) and a transport position (FIG. 2). The planting implement 10 may include a hitch in order for the planting implement 10 to be pulled by a tractor or other agricultural vehicle. The planting implement 10 generally includes a toolbar 12, which has a center section 14, a left wing section 16 ("left side gull wing") and a right wing section 18 ("right side gull wing"). Row units 20 that facilitate the planting of the rows of seeds are mounted to the toolbar 12 at equally spaced intervals. The row units 20 may deposit the seeds by vacuum pressure, which enables the row units 20 to control the seed flow rate and the spacing between the seeds as they are planted. The row units 20 may include gauge wheels 22, openers 24 to cut a furrow in the field, and seed boxes 26. A central bulk assembly 28, which provides seeds to the row units 20, may be operably coupled to the row units 20 via an inductor box, accompanying hoses, and/or conduits. The central bulk assembly 28 includes one or more storage tanks 30, 32 for housing the seeds to be planted. The planter 10 may also include an air pressure differential system, an air compressor system, and an electric generator that are each connected to the toolbar 12. The planter 10 has various hydraulic, pneumatic, and electrical lines to support various cylinders and systems that are included on the planter 10.

Toolbar 12 may include a cylinder and linkage system 34 that is configured to move the toolbar 12 in between the work and transport positions via actuators and accompanying four-bar linkages. The cylinder and linkage system 34 may include left and right gullwing cylinders 36, toolbar cylinders 38, adjustable tension links 40, outer links 42, and pivot arms 44 that couple the cylinders 38 to the pivot mounts 46 in order to raise or lower the wing sections 16, 18 (FIG. 3). The gullwing cylinders 36 are coupled to pivot plates 48 and function to hold the wing sections 16, 18 off the ground while the center toolbar section 14 lowers to the ground first, which prevents bowing and enables each of the row units 20 of the wing toolbar sections 16, 18 to reach the ground simultaneously. The single acting gullwing cylinders 36 cannot provide a downforce on the wing toolbar sections 16, 18. The operation of the hydraulic cylinders 36, 38 may be controlled by a hydraulic valve (not shown). As can be seen, the gullwing cylinders 36 and accompanying pivot plates 48 and linkages 40, 42 occupy a substantial amount of space along the frame of the toolbar 12.

The planter 10 may also include an electronic control unit (ECU) that provides command signals to the hydraulic cylinders 36, 38. For example, the ECU may send a raise or lower command to the hydraulic valve which in turn controls the operation of the cylinders 36, 38 by increasing or decreasing the pressure in the cylinders 36, 38. In this regard, an operator may input a control command to trigger the ECU to move the wing sections 16, 18 in between the field-working (FIG. 1) and transport (FIG. 2) positions.

Figure 4:
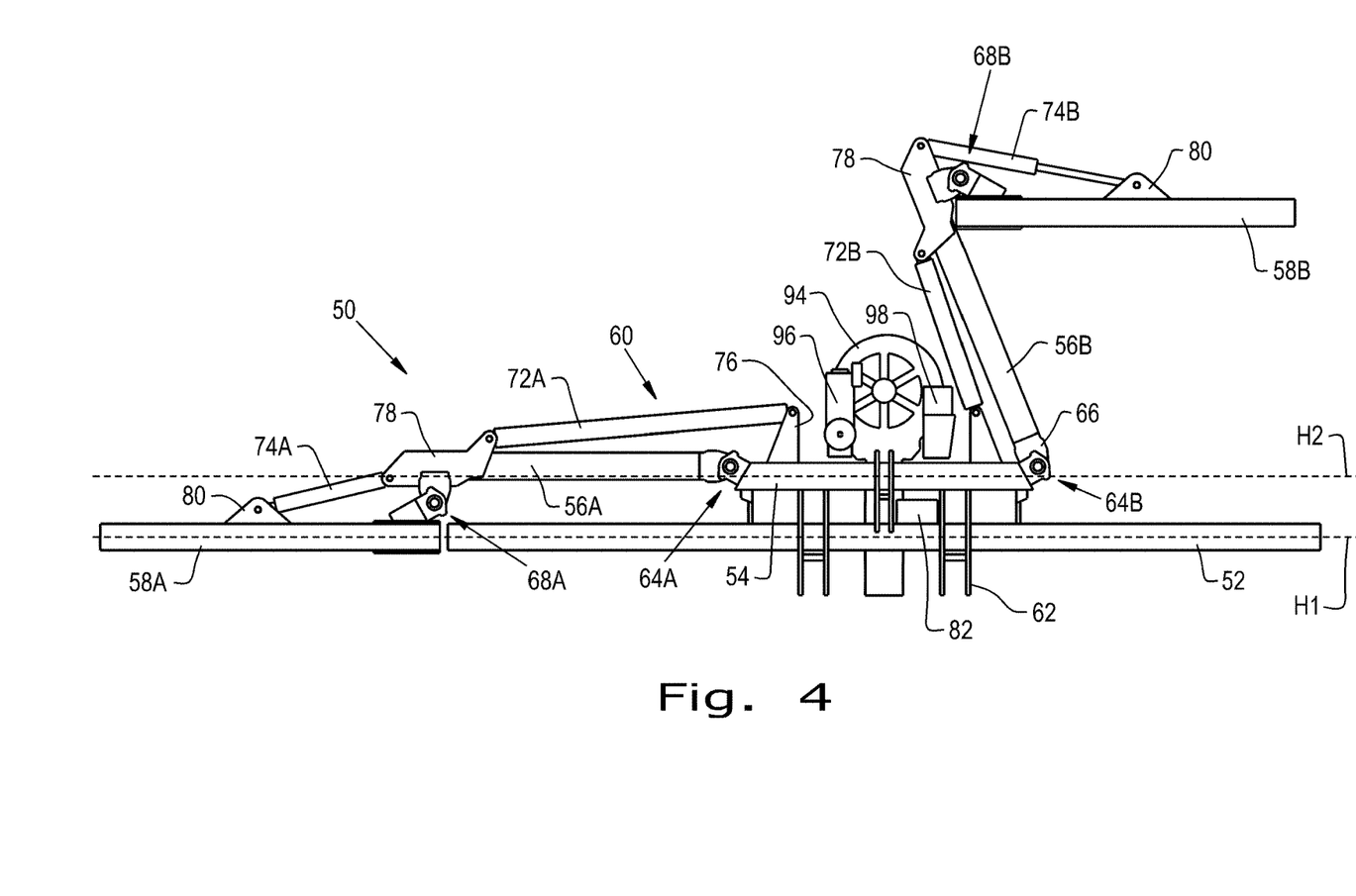
FIG. 4 illustrates an embodiment of a stacking planter toolbar assembly according to the present invention.
Figure 5:
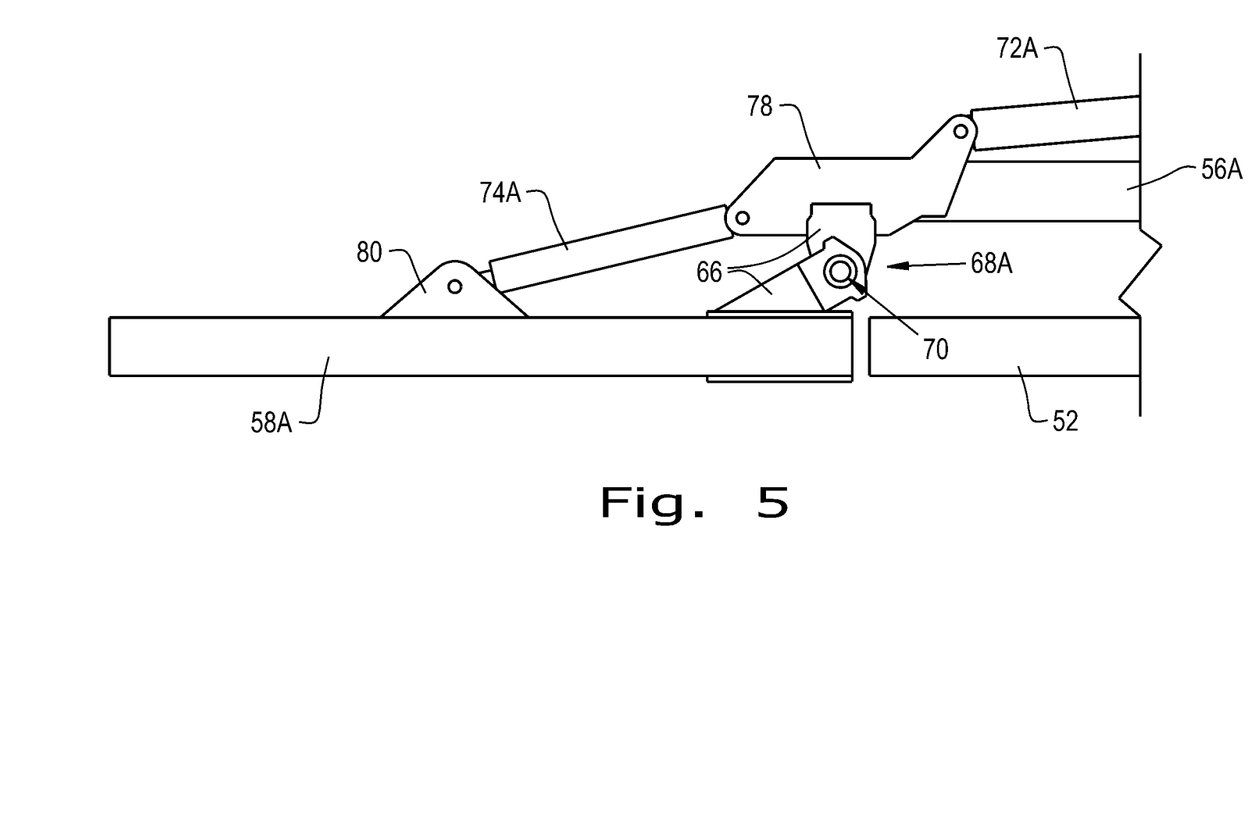
FIG. 5 is an end view of the toolbar assembly as shown in FIG. 4.
Figure 6:
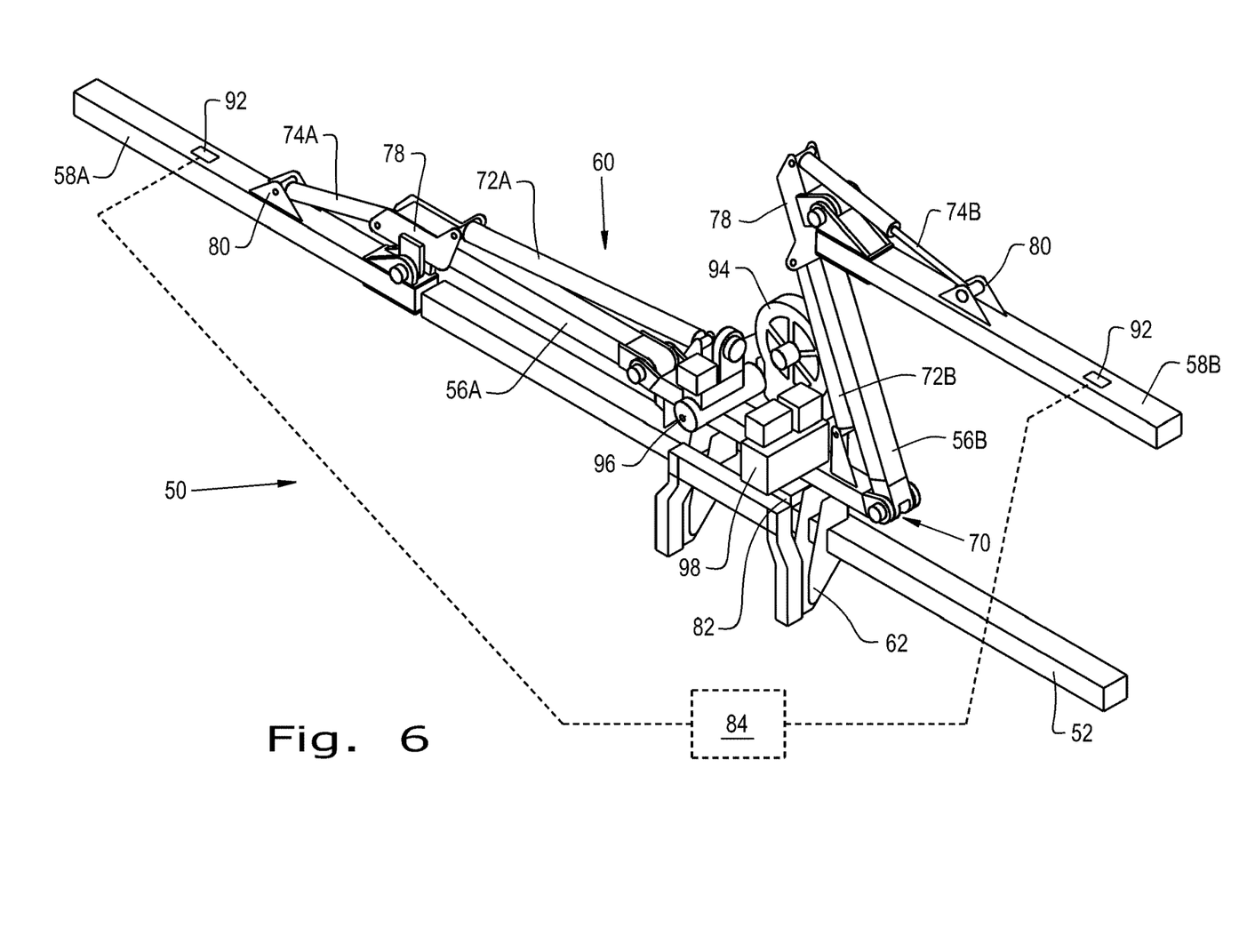
FIG. 6 is a perspective view of the stacking toolbar assembly according to the present invention.

Referring now to FIGS. 4-6, there is shown an embodiment of the stacking planter toolbar assembly 50 according to the present invention. The toolbar assembly 50 generally includes a center toolbar 52 that defines a horizontal axis "H1", a center support beam 54, a left and right pivot beam 56A, 56B, a left and right wing toolbar 58A, 58B, and an actuating system 60.

The center toolbar 52 and the left and right wing toolbars 58A, 58B may be in the form of solid or hollow beams that provide support for the various components and row units affixed thereto. The toolbars 52, 58A, 58B may be composed of any suitable material such as a metal, an alloy, a polymer, etc. As shown, there is a gap in between the wing toolbars 58A, 58B and the center toolbar 52; however, this gap is only exemplary in nature and such a pronounced gap may not actually be present.

The center support beam 54 is located above the center toolbar 52 and defines a second horizontal axis "H2" that is substantially parallel to the first horizontal axis H1. The center support beam 54 may be coupled to the center toolbar 52 by a pair of support brackets 62. The center support beam 54 and the pivot beams 56A, 56B may be composed of any suitable material such as a metal, an alloy, a polymer, etc. The pivot beams 56A, 56B may be rotatably coupled to the center support beam 54 at pivot joints 64A, 64B. The joints 64A, 64B are shown to include pivot extension beams 66 such that the joints 64A, 64B may be located slightly above the axis H2 of the center support beam 54 and substantially in line with the center axis of each pivot beam 56A, 56B. The pivot extension beams 66 may be coupled, e.g. welded or fastened, onto the center support beam 54 and the pivot beams 56A, 56B, respectively. The wing toolbars 58A, 58B may be moveably coupled to the pivot beams 56A, 56B at pivot joints 68A, 68B. The pivot joints 68A, 68B may also include pivot extension beams 66 such that the pivot joints 68A, 68B are located beneath the pivot beams 56A, 56B and above the wing sections 58A, 58B. In this regard, the pivot extension beams 66 may be respectively coupled to the pivot beams 56A, 56B and the wing toolbars 58A, 58B. The pivot joints 64A, 64B and 68A, 68B may include pivot castings 70 which thereby avoids complex welded joint assemblies (FIG. 5). Hence, the pivot extension beams 66 are pivotally connected to one another by a respective pivot casting 70.

The actuating system 60 may include left and right support beam actuators 72A, 72B and left and right toolbar actuators 74A, 74B. The support beam actuators 72A, 72B are respectively coupled to the center support beam 54 and the pivot beams 56A, 56B. The toolbar actuators 74A, 74B are respectively coupled to the pivot beams 56A, 56B and the wing toolbars 58A, 58B. In more detail, the support beam actuators 72A, 72B each have a proximal end that is pivotally coupled to a mounting bracket 76 and a distal end that is pivotally coupled to a mounting bracket 78. The toolbar actuators 74A, 74B each have a proximal end pivotally coupled to the mounting bracket 78 and a distal end that is pivotally coupled to a mounting bracket 80. The toolbar actuators 74A, 74B may provide a downforce onto the wing toolbars 58A, 58B. The actuators 72A, 72B and 74A, 74B may be in the form of electric or hydraulic cylinders. In the present embodiment, the actuators 72A, 72B and 74A, 74B are in the form of hydraulic cylinders that are operably coupled to a hydraulic or electric valve 82. The valve 82 may be in the form of a valve block and may be configured to plumb the actuating system 60 of the stacking toolbar assembly 50.

Upon actuation of the of actuators 72A, 72B and 74A, 74B the wing toolbars 58A, 58B are moveable from a work position in which the wing toolbars 58A, 58B are substantially laterally aligned with the horizontal axis H1 of the center toolbar 52 and a transport position in which the wing toolbars 58A, 58B are stacked above the center toolbar 52. The left and right wing toolbars 58A, 58B may be independently moveable, as shown in FIGS. 4 and 6, or the wing toolbars 58A, 58B may be jointly moveable such that the wing toolbars 58A, 58B move in phase with one another. It should be appreciated that the toolbar assembly 50 of the present invention does not include a traditional four-bar linkage. In other words, the wing toolbars 58A, 58B can be raised to the transport position by independently controlling the angle of the wing toolbars 58A, 58B with respect to center toolbar 52 without the need of known gullwing cylinders and accompanying linkages.

In the present embodiment, the toolbar assembly 50 is symmetrical in that it includes a left and right pair of the aforementioned components. However, it is conceivable for the toolbar assembly 50 in include only one wing toolbar 58. Thereby, in the case of only one wing toolbar 58, there would only be one pivot beam 56, one support beam actuator 72, and one toolbar actuator 74.

Referring now to FIGS. 4-7 collectively, the toolbar assembly 50 may also include a controller 84 and may be operably coupled to the hydraulics 86 and electronics 88 of the tractor or other agricultural vehicle respectively through hydraulic hoses and a data link 90. The toolbar assembly 50 may also include one or more sensors 92 that are operatively coupled to and in communication with the controller 84.

Figure 7:
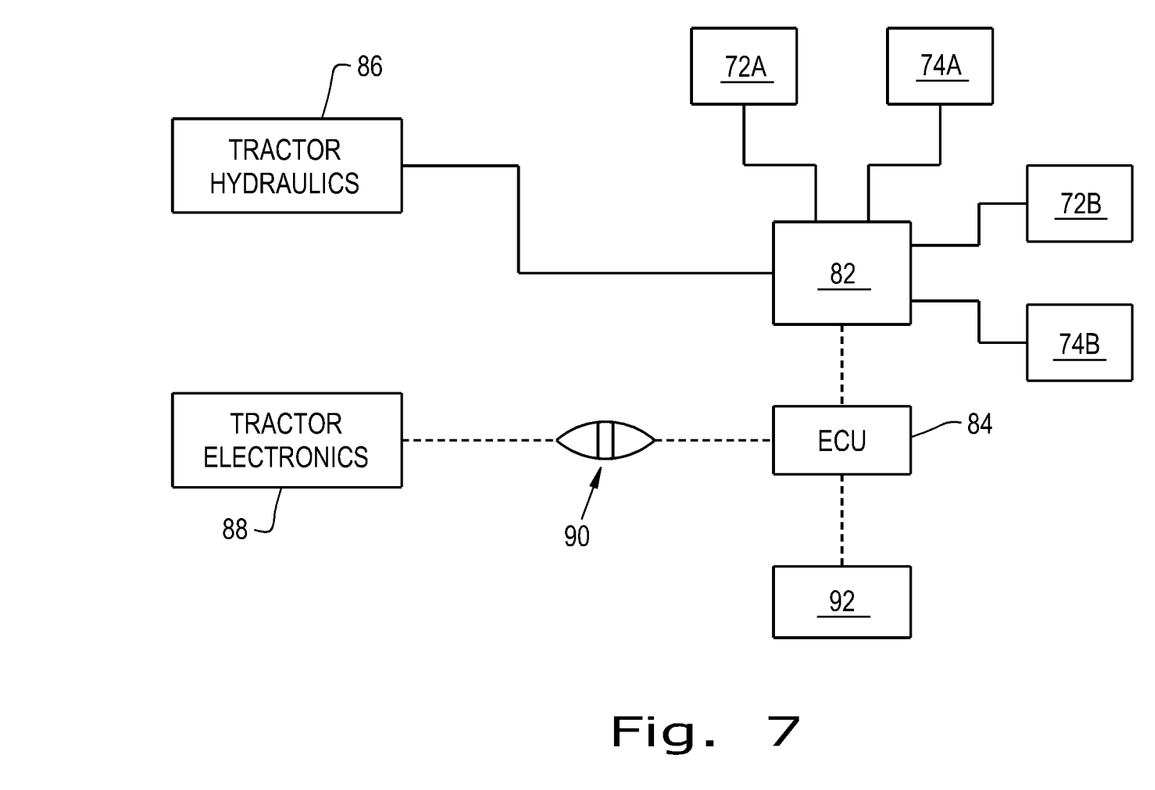
FIG. 7 is a schematic illustration of the electrical and hydraulic system that may be incorporated in the stacking planter toolbar assembly according to the present invention.

The controller 84 is operatively coupled to the actuators 72A, 72B and 74A, 74B via the valve block 82 and may thereby be configured to control the actuation of the actuators 72A, 72B and 74A, 74B. The controller 84 may be in the form of an electronic control unit (ECU), a CPU, or a processor. In the present embodiment, the controller 84 is in the form of an ECU. The controller 84 may receive various input commands from an operator, for example plant, headland, downforce, and/or transport commands. The controller 84 may also be preprogramed with a set parameter, for example the duration of actuation, in order to raise or lower the actuators 72A, 72B and 74A, 74B to a desired position upon receiving an input command. Additionally, the controller 84 may receive position signals from the sensor(s) 92 which pertain to the position of the toolbar assembly 50. In this regard, the controller 84 may define the orientation of one or all of the actuators 72A, 72B and 74A, 74B through user input data, preprogrammed values, and/or the position signal of the sensor(s) 92. The controller 84 may set the position of the actuators 72A, 72B and 74A, 74B and receive feedback of the position of the actuators 72A, 72B and 74A, 74B. Thereby, the controller 84 may manipulate the valve 82 in order to adjust the actuators 72A, 72B and 74A, 74B in unison or independently to raise or lower either or both of the toolbar wings 58A, 58B.

The datalink 90 may be a wired or wireless connection, and the data link 90 may also provide an ISOBUS connection between the controller 84 and the electronics 88 of the tractor. The ISOBUS connection may enable the transmission of various data between the toolbar assembly 50 and the tractor. For example, the sensed position of the toolbar assembly 50 from the sensor(s) 92 may be communicated to the electronics 88 of the tractor.

The sensor(s) 92 may be configured for providing a position signal, e.g. the vertical position and/or incline angle, of the pivot beams 56A, 56B and/or the wing toolbars 58A, 58B. As shown in FIG. 6, by way of example only, the toolbar assembly 50 may include two position sensors 92 located at each toolbar wing 58A, 58B. Alternatively, for example, there may be four sensors 92 coupled to the support beams 56A, 56B and the toolbar wings 58A, 58B. The sensor(s) 92 may communicate wirelessly or via a wired connection to the controller 84. The sensor(s) 92 may be in the form of one or more rotary potentiometers, displacement sensors, inclinometer sensors, optical sensors, strain gauges, pressure sensors, and the like. The sensors 92 may be of a uniform type or the sensors 92 may be various different types of sensors such as optical sensors located on the toolbar wings 58A, 58B and inclinometer sensors located on the pivot beams 56A, 56B.

The stacking toolbar assembly 50 of the present invention provides for a more narrow and lower stacked position. Without the prior art gullwing cylinders and accompanying four-bar linkage, the stacking toolbar assembly 50 has a more streamlined profile and it also provides for additional space in order to mount various parts. For example, an air pressure differential system 94 (e.g. a fan), an air compressor 96, an electric generator 98, and the valve 82 in the form of a valve block may each be centrally mounted on the toolbar assembly 50.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural implement, comprising:
   a stacking toolbar assembly, including:
      a center toolbar defining a first horizontal axis;
      a center support beam located above said center toolbar and defining a second horizontal axis substantially parallel to said first horizontal axis;
      at least one pivot beam rotatably coupled to said center support beam at a first joint;
      at least one wing toolbar moveably coupled to said at least one pivot beam at a second joint, said second joint including a first pivot extension beam coupled to said at least one pivot beam and a second pivot extension beam pivotally connected to said first pivot extension beam by a pivot casting and coupled to said at least one wing toolbar; and
   an actuating system, including:
      at least one first actuator coupled to said center support beam and said at least one pivot beam;
      at least one second actuator coupled to said at least one pivot beam and said at least one wing toolbar such that said at least one wing toolbar is moveable from a work position in which said at least one wing toolbar is substantially laterally aligned with said first axis of said center toolbar and a transport position in which said at least one wing toolbar is stacked above said center toolbar;

a first mounting bracket pivotally interconnecting a proximal end of said first actuator to said center support beam;

a second mounting bracket pivotally interconnecting a distal end of said first actuator to said at least one pivot beam, said second mounting bracket pivotally connecting a proximal end of said second actuator to said at least one pivot beam, and said second mounting bracket interconnecting the first pivot extension beam and said at least one pivot beam; and a third mounting bracket pivotally connecting a distal end of said second actuator to said at least one wing toolbar.

2. The agricultural implement of claim 1, wherein said stacking toolbar assembly does not include a four-bar linkage such that said at least one wing toolbar is raised to said transport position by independently controlling an angle of said at least one wing toolbar with respect to said center toolbar.

3. The agricultural implement of claim 1, wherein said at least one second actuator provides a downforce onto said at least one wing toolbar.

4. The agricultural implement of claim 1, wherein said at least one pivot beam includes a left pivot beam and a right pivot beam each being rotatably coupled to said center support beam at a respective left first joint and right first joint.

5. The agricultural implement of claim 4, wherein said at least one wing toolbar includes a left wing toolbar and a right wing toolbar each being respectively moveably coupled to said left pivot beam and said right pivot beam at a respective left second joint and right second joint.

6. The agricultural implement of claim 5, wherein said actuating system includes a left first actuator and a right first actuator each being coupled to said center support beam and respectively coupled to said left and right pivot beams.

7. The agricultural implement of claim 6, wherein said actuating system includes a left second actuator and a right second actuator each being respectively coupled to said left and right pivot beams and said left and right wing toolbars.

8. The agricultural implement of claim 7, wherein said left and right wing toolbars are at least one of independently moveable and jointly moveable in which said left and right wing toolbars are moveable in phase with one another.

9. The agricultural implement of claim 1, wherein said first joint comprises a pivot casting.

10. The agricultural implement of claim 1, further including a controller operatively coupled to said first and second actuators and configured to control the actuation of the first and second actuators, and at least one sensor in communication with the controller, said sensor configured for providing a position signal of said at least one wing toolbar.

11. The agricultural implement of claim 1, wherein said second mounting bracket connects said at least one first actuator and said at least one pivot beam such that only said at least one first actuator and said at least one pivot beam are respectively interconnected in between said center support beam and said second mounting bracket.

12. A stacking toolbar assembly for an agricultural implement, including:

a center toolbar defining a first horizontal axis;

a center support beam located above said center toolbar and defining a second horizontal axis substantially parallel to said first horizontal axis;

a left pivot beam and a right pivot beam respectively rotatably coupled to said center support beam at a left first joint and a right first joint;

a left wing toolbar and a right wing toolbar each being respectively moveably coupled to said left pivot beam and said right pivot beam at a respective left second joint and right second joint, said left and right second joints respectively include a first pivot extension beam coupled to said left and right pivot beams and a second pivot extension beam pivotally connected to said first pivot extension beam by a pivot casting and coupled to said left and right wing toolbars; and an actuating system, including:

a left first actuator and a right first actuator each being coupled to said center support beam and respectively coupled to said left pivot beam and said right pivot beam;

a left second actuator and a right second actuator each being respectively coupled to said left pivot beam and said right pivot beam and said left wing toolbar and said right wing toolbar such that said left wing toolbar and said right wing toolbar are moveable from a work position in which said left and right wing toolbars are substantially laterally aligned with said first axis of said center toolbar and a transport position in which said left and right wing toolbars are stacked above said center toolbar;

a left and right first mounting bracket respectively pivotally interconnecting a respective proximal end of said left and right first actuators to said center support beam;

a left and right second mounting bracket respectively pivotally interconnecting a respective distal end of said left and right first actuator to said left and right pivot beams, said left and right second mounting brackets respectively pivotally connecting a respective proximal end of said left and right second actuators to said left and right pivot beams, and said left and right second mounting brackets respectively interconnecting said first extension beams and said left and right pivot beams; and a left and right third mounting bracket respectively pivotally connecting a respective distal end of said left and right second actuators to said left and right wing toolbars.

13. The stacking toolbar assembly of claim 12, wherein said stacking toolbar assembly does not include a four-bar linkage such that said left and right wing toolbars are raised to said transport position by independently controlling a respective angle of said left and right wing toolbars with respect to said center toolbar.

14. The stacking toolbar assembly of claim 12, wherein said left and right second actuators provide a respective downforce onto said left and right wing toolbars.

15. The stacking toolbar assembly of claim 12, wherein said left and right wing toolbars are at least one of independently moveable and jointly moveable in which said left and right wing toolbars are moveable in phase with one another.

16. The stacking toolbar assembly of claim 12, further including a controller operatively coupled to said left and right first actuators and said left and right second actuators, said controller configured to control the actuation of said left and right first actuators and said left and right second actuators, and at least one left sensor and at least one right sensor in communication with the controller, said at least one left sensor and at least one right sensor configured for providing a position signal of said left and right wing toolbars.

17. The stacking toolbar assembly of claim 12, wherein said left and right first joints each include a respective pivot casting.

18. The stacking toolbar assembly of claim 12, wherein said left and right first actuators and said left and right second actuators are each respectively in the form of hydraulic cylinders.

19. The stacking toolbar assembly of claim 12, wherein said left and right second joints are located beneath said left and right pivot beams and above said left and right wing toolbars.

20. The stacking toolbar assembly of claim 12, wherein said left and right second mounting brackets respectively connect said left and right first actuators and said left and right pivot beams such that only said left and right first actuators and said left and right pivot beams are respectively interconnected in between said center support beam and said left and right second mounting brackets.

* * * * *